Figure 5:
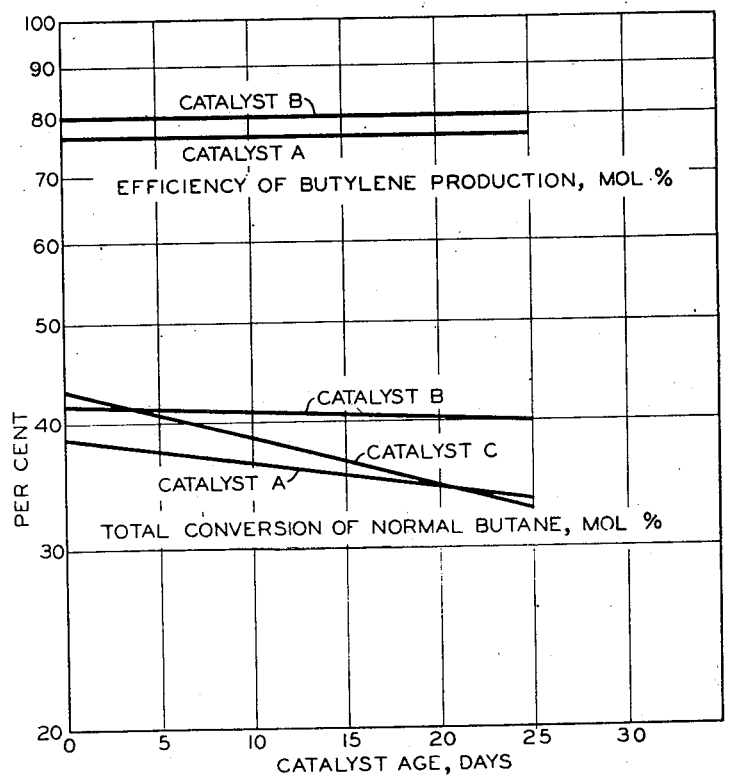

Aug. 5, 1952 J. R. OWEN 2,606,159
DEPTH-CONTROLLED IMPREGNATION OF ALUMINA-BASE CATALYST PELLETS
Filed Oct. 30, 1950 2 SHEETS—SHEET 1

WHOLE AND HALVED ALUMINA PILLS

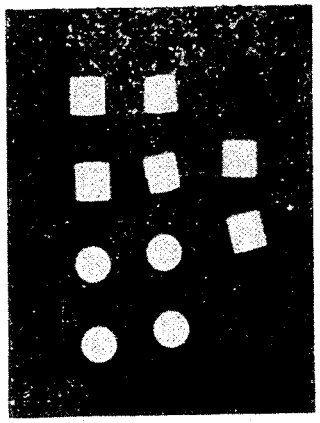

FIG. 1.
UNIMPREGNATED

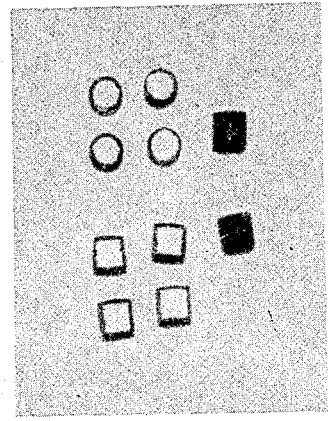

FIG. 2.
SURFACE IMPREGNATED ($Cr_2O_3$)
(IMPREGNATED BEFORE REMOVAL
OF ANY BINDER)

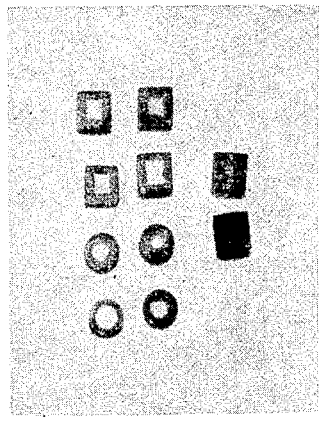

FIG. 3.
SHELL IMPREGNATED ($Cr_2O_3$)
(IMPREGNATED AFTER REMOVAL
OF BINDER FROM OUTER SHELL)

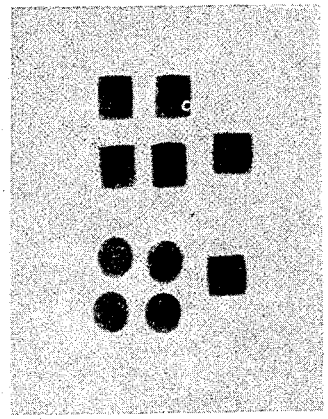

FIG. 4.
COMPLETELY IMPREGNATED ($Cr_2O_3$)

INVENTOR.
J. R. OWEN
BY
Hudson & Young
ATTORNEYS

Aug. 5, 1952 J. R. OWEN 2,606,159
DEPTH-CONTROLLED IMPREGNATION OF ALUMINA-BASE CATALYST PELLETS
Filed Oct. 30, 1950 2 SHEETS—SHEET 2

INVENTOR.
J. R. OWEN
BY Hudson & Young
ATTORNEYS

Patented Aug. 5, 1952

2,606,159

UNITED STATES PATENT OFFICE 2,606,159

DEPTH-CONTROLLED IMPREGNATION OF ALUMINA-BASE CATALYST PELLETS

James R. Owen, Bartlesville, Okla., assignor to Phillips Petroleum Company, a corporation of Delaware Application October 30, 1950, Serial No. 192,886

27 Claims. (Cl. 252—455)

This invention relates to improved supported catalysts and to a process for the preparation of such catalysts, particularly catalysts for hydrocarbon conversion reactions. This invention is particularly useful for the preparation of shaped porous catalysts, i. e., catalysts of definite form and size, for example, catalysts prepared by pelleting or pilling pulverized material.

The use of pelleted or pilled catalysts for hydrocarbon conversion reactions and the advantages of such catalysts are well known. Pellets comprising activated alumina and other oxides are often used as catalysts for the dehydrogenation of paraffins. These catalysts may be prepared by finely grinding precipitated alumina gel or naturally occurring alumina together with one or more additional oxides, mixing with a binder, forming into pellets, and calcining. Binders used comprise hydrogenated corn oil, hydrogenated peanut oil, graphite, and aluminum stearate. These materials not only facilitate the formation of coherent pellets, but also act as lubricants for the pelleting apparatus. The subsequent calcination is usually conducted under such conditions that the binder and any residual moisture are removed from the pellets. Since the binders are usually combustible materials, the calcination is often conducted in an oxidizing atmosphere to ensure the complete removal of the binder. The removal of the binder produces a catalyst having a high porosity.

Pelleted catalysts are often prepared by impregnating pellets of porous inert or catalytically active material which serves as a support with a solution of catalytically active material and evaporating the water therefrom, sometimes with subsequent calcination to produce the finished catalyst. Other methods of producing composite or supported solid catalyst are known in the art. This invention is applicable to catalyst preparation by impregnation of a catalytic or non-catalytic support material. The invention is particularly applicable to the production of a catalyst comprising a catalytically active metal oxide supported on a shaped porous carrier material.

It is often advantageous to prepare a composite catalyst, e. g. a catalyst comprising mixed metal oxides, with a major proportion of an inert or less active catalytic material and a minor proportion of an active catalyst, promoter, and the like. As a specific example, pellets of alumina are often impregnated with an aqueous solution of a chromium salt which is subsequently converted to an oxide of chromium by calcination. One or more of the oxides of vanadium, columbium, tantalum, tungsten, molybdenum, manganese, potassium, beryllium, magnesium, zinc, cadmium, calcium, strontium, and barium are often combined with an oxide of aluminum, magnesium, iron, or the like to produce catalysts particularly suited to various hydrocarbon conversion reactions. Recognized techniques for incorporating materials of this sort include co-precipitation as mixed gels or mixing of powdered oxides prior to pelleting, and impregnating the calcined pellets with solution of a salt which, on subsequent treatment, is converted to the desired oxide. In catalysts prepared by these methods, the minor component is distributed more or less evenly throughout the major component, so that the finished pellet appears to be almost homogeneous.

I have discovered that, when the minor component or promoter is concentrated at or near the surface of the catalyst pellet, and the inner part of the pellet is substantially free of the minor component, a catalyst of superior activity is obtained. I have further discovered a method for obtaining such a concentration of the minor component.

An object of this invention is to provide an improved process for the preparation of catalysts. Another object is to provide an improved catalyst in the form of a shaped solid having a porous construction. It is also an object of the invention to provide a faster and more economical method of impregnating porous carriers with catalytic metals and metal oxides. Other objects and advantages of the present invention will be apparent from the accompanying disclosure.

The invention is applicable to the partial or shell impregnation of pelleted porous materials commonly used as catalyst carriers and catalyst supports, particularly aluminous materials of the nature of alumina and silica-alumina mixtures prepared by various known methods, with catalyst metals, metal oxides, and mixtures thereof. Catalytic metals and metal oxides include the metals and oxides of copper, silver, gold, beryllium, magnesium, calcium, barium, strontium, zinc, cadmium, titanium, zirconium, thorium, tin, lead, vanadium, columbium, tantalum, chromium, molybdenum, tungsten, uranium, manganese, cobalt, nickel, iron, palladium, rhodium, iridium, and platinum.

The invention is particularly applicable to the catalysts known in the art as hydrogenating-dehydrogenating catalysts which are metals and metal oxides and their mixtures capable of dehydrogenating hydrocarbons and hydrogenating unsaturated hydrocarbons. They are frequently referred to as catalysts which affect the H-C linkage in a hydrocarbon molecule. These catalysts include Ni, Co, Fe, Pt, Pd, Rh, Mn, Cr, Mo, W, U, V, Zr, Ti, Th, Ce, Pb, Mg, Hg, Be, Ca, Sr, Ba, Zn, Cu, Ag, their oxides, and mixtures of both their oxides and metals.

In the preparation of a specific catalyst in accordance with this invention, active alumina, obtained by precipitation of hydrous alumina gel and drying, or by other methods known in the art, or active alumina prepared as described in my Patent No. 2,499,675, is finely ground, mixed with a volatile or combustible binder, and formed into pellets. The pellets are suitably cylindrical, but may be of other shapes, such as spherical. The pellets are then calcined in an oxidizing atmosphere under controlled conditions of temperature and time in such a manner that a predetermined amount such as 10 to 85 per cent or preferably 50 to 75 per cent of the binder is removed. Since the combustion of the binder begins at the surface of the pellet and progresses inwardly, interruption of the combustion leaves a core of binder in the inner part of the pellet, so that the outer part of the pellet is rendered relatively porus and the inner part remains relatively nonporous. The combustion of the desired proportion of the binder and the removal of residual water may be accomplished by heating the pellets in a furnace through which an oxygen-containing gas is passed at about 400 to 1100° F. for a contact time of about 3 to 15 minutes. In some cases, the combustion, once initiated, is self-sustaining, and the heat of combustion must be taken into account in controlling the temperature. The combustion may be stopped by interrupting the flow of oxidizing gas and cooling the furnace. The specific procedure used in any given instance will depend on the binder used, the specific apparatus, and the extent of combustion desired and is readily determinable by trial.

After the combustion step, the pellets are impregnated with a minor component. A preferred procedure comprises treating the pellets with a solution of a metal salt that is converted to the desired minor component by ignition. This treatment may be effected by spraying the solution onto the pellets, by dipping the pellets into the solution, or by placing the pellets in the solution and evaporating. When chromium oxide is the desired minor component, a suitable solution is an aqueous solution of chromium trioxide. Other compounds, such as chromic nitrate, may be used if desired. Similarly, various solutions of other metal salts may be employed as will be apparent to those skilled in the art. The use of ammonium molybdate is preferred as the impregnating solution when preparing molybdenum oxide shell-type catalyst while platinic chloride and silver nitrate are the preferred impregnating solutions for the respective metals.

The impregnated pellets are then ignited at 400 to 1100° F. to remove water, to convert the dissolved salt to the desired oxide, and to remove substantially all of the remaining binder. An oxidizing atmosphere is ordinarily desirable during at least part of this ignition.

When the cross sections of pellets of chromia-alumina catalysts prepared in accordance with this invention are examined, it is found that the cores are white, and the peripheral parts have the characteristic color of chromia-alumina mixtures. Thus it appears that the aqueous solution penetrates only through those pores or interstices from which the binder has been removed.

Instead of combustion, solvent extraction may be used to remove the binder from the outer part of the pills. Suitable solvents comprise benzene, chloroform, gasoline, ethers, carbon tetrachloride, and other well known oil solvents. The desired proportion of the binder is removed by regulating the time of contact of the pellets with the solvent. The extraction is followed by evaporation of residual solvent from the pellets, and, finally by incorporation of the minor component and ignition as previously described.

The drawings provide a more complete understanding of the invention. Figures 1 to 4 represent a photolithograph of actual catalysts prepared according to the invention while Figure 5 is a graphic comparison of a catalyst made by the process of the invention and prior art catalysts of the same constituents. Figure 1 shows unimpregnated alumina pellets, some of which are halved transversely, some longitudinally, and whole cylindrical pellets. These half and whole cylindrical pellets are pure white and 99+% active alumina. Figure 2 shows alumina pellets like those of Figure 1 which were dipped in chromic acid solution before burning out any of the binder, drained, dried, and calcined to convert the chromium compound to $Cr_2O_3$ and drive off the binder. The thin black surface of the pellets is readily discernible in the photograph. Figure 3 shows catalysts made by burning out the outer portion of the binder from alumina pellets of the kind shown in Figure 1 by subjecting them to a calcination in the range of 1000 to 1100° F. for a time in the range of 3 to 15 minutes so as to form a porous shell around an impervious alumina core and then impregnating the resulting porous shell with a chromic acid solution followed by calcining the impregnated shell to convert the chromic acid to $Cr_2O_3$ and drive off the remainder of the binder. The cores are white and unimpregnated, the outer portion or shell of the pellet being impregnated with $Cr_2O_3$.

Figure 4 shows catalyst pellets made from alumina pellets of Figure 1 by impregnating them entirely to the center after burning out the binder. These pellets are rather uniformly impregnated throughout with $Cr_2O_3$.

The pellets pictured in Figures 1 to 4, inclusive are 1/8″ by 1/8″ cylindrical pellets magnified two and one-half times.

In Figure 5, catalyst A is completely impregnated and is of the type shown in Figure 4. Catalyst B is shell-impregnated and of the type shown in Figure 3. Catalyst C is impregnated throughout the pellet and contains the same amount of chromium oxide as catalyst B. The efficiency of butylene production is shown for catalysts A and B, and the activity of catalysts A, B, and C in the dehydrogenation of normal butane over a 25-day period is also graphically shown.

EXAMPLE I

A chromia-alumina dehydrogenation catalyst, designated as catalyst A, was prepared by the following procedure.

Cylindrical alumina pellets 1/8 inch in diameter were calcined for 6 hours in a tunnel kiln at a maximum kiln temperature of 1292° F. The binder used in forming the pellets was hydrogenated corn oil, known commercially as "Sterotex," and was completely removed by the calcination. The calcined pellets were dipped in a 30 to 40 per cent aqueous solution of chromium trioxide, were drained, dried at 194 to 302° F., and calcined at 1112° F. in a tunnel kiln. Upon analysis the $Cr_2O_3$ content of catalyst A was found to be 10.7 weight per cent of the catalyst.

EXAMPLE II

A second chromia-alumina dehydrogenation catalyst, designated as catalyst B, was prepared by the procedure used for catalyst A, except that the first calcination was conducted in a vertical tube furnace at a maximum temperature of 1100° F. and a residence time of about 10 minutes. Approximately 25 to 50 per cent of the binder remained after the first calcination. Some of the finished catalyst pellets were broken and found to have white cores about $\frac{1}{16}$ to $\frac{3}{32}$ inch in diameter. The peripheral parts had the characteristic color of chromia-alumina mixtures. Upon analysis the $Cr_2O_3$ content of catalyst A was found to be 18.4 weight per cent of the catalyst.

EXAMPLE III

Catalysts A and B of Example I and II were tested for the dehydrogenation of butane under substantially identical conditions. Normal butane was preheated to 1100° F. and passed into contact with the catalyst at a space velocity of 650 volumes of butane per volume of catalyst per hour. The catalyst was contained in tubes 2 inches in diameter in heat-exchange with hot gases at 1200° F. so that the conversion temperature was approximately 1100° F. throughout. Each of the catalysts was tested for a period of 25 days with alternate dehydrogenation and catalyst revivification periods of sixty minutes each. The accompanying drawing shows the efficiency of the butylene production and the total per pass conversion of normal butane, both expressed as mol per cent, for the two catalysts during the test period. The total conversion of normal butane indicated on the drawing represents the quantity of normal butane converted to all other products, expressed as mol per cent of the normal butane feed, in each pass over the catalyst. The efficiency of butylene production, as indicated on the drawing, represents the percentage of the normal butane used up, expressed in mol per cent, which was converted to butylenes.

The average activity of catalyst B, as indicated by the average proportion of normal butane converted during the 25-day period, was about 41 per cent, whereas that of catalyst A was only about 38 per cent. At the end of this period, the activity of catalyst B was at least 96 per cent of the initial activity, whereas that of catalyst A was less than 77 per cent of the corresponding initial activity. Furthermore, the efficiency of butylene production (100 x butylenes produced/ normal butane converted) of catalyst B was about 4 per cent greater than that of catalyst A throughout the 25-day period.

EXAMPLE IV

Another catalyst identified as catalyst C was prepared by the procedure used for catalyst A burning out all of the Sterotex before the impregnation of the pellets. However, the concentration of chromic acid solution was adjusted so as to deposit the chromium oxide content of catalyst B, viz., 18.4 weight per cent $Cr_2O_3$. Catalyst C was tested in the dehydrogenation of butane under substantially identical conditions to those set forth in Example III. The activity for catalyst C over a 25-day period is shown on Figure 5 of the drawing and may readily be compared with catalysts A and B in this respect. It can clearly be seen that the higher activity of catalyst B over that of catalyst A is not attributable to the greater amount of chromium oxide in catalyst B since catalyst C contains the same amount of $Cr_2O_3$.

EXAMPLE V

Two catalysts consisting of nickel oxide deposited on alumina were prepared by methods comparable to the methods used in preparing catalysts A and B and are designated as catalyst D (completely impregnated) and catalyst E (incompletely or shell-impregnated). Both of these catalysts contained the same amount of nickel oxide, viz., 9.0 per cent. The impregnating solution used was $Ni(NO_3)_2 \cdot 6H_2O$. After impregnation the catalysts were calcined for several hours at 1000° F. in a stream of air.

Catalysts D and E were then reduced at 650° F. and tested before exposure to air for ethylene hydrogenation with a 1:1 ethylene and hydrogen ratio and a space velocity of 10,000 volumes (STP) of total gas per catalyst volume per hour. The extent of hydrogenation was measured by comparison of the thermal conductivity of the charge and effluent gases in a thermal conductivity cell previously calibrated with known mixtures of hydrogen and ethylene. The results of the tests are shown in Table I.

EXAMPLE VI

Two catalysts F and G were prepared in accordance with the procedure outlined in Examples I and II with respect to catalysts A and B, respectively, and comprising nickel oxide deposited on zinc oxide pellets. The same nickel nitrate solutions were used for impregnating as in Example V and the calcined impregnated pellets contained 9.0 weight per cent nickel oxide before reduction. These catalysts were tested in the same reaction under substantially the same reaction conditions as were used in Example V. The results obtained are shown in Table I.

EXAMPLE VII

Two catalysts consisting of nickel oxide deposited on silica-alumina pellets designated H and I were prepared by the processes of Examples I and II, respectively, so as to deposit approximately 9.0 weight per cent nickel oxide on the pellets. The same impregnating solution was used as in the process of Example V. The silica-alumina pellets contained approximately 90 per cent $SiO_2$ and 10 per cent $Al_2O_3$ (by weight). Catalysts H and I were tested in substantially the same process as was used in testing the other nickel catalyst and the results obtained are shown in Table I.

EXAMPLE VIII

A catalyst consisting of copper oxide deposited on alumina pellets and designated catalyst J was prepared in accordance with the procedure outlined in Example II to deposit approximately 9.0 weight per cent copper oxide in the porous shell of the alumina pellets. Catalyst J was reduced in the same manner as the nickel oxide catalyst and a run was made in the hydrogenation of ethylene under the same reaction conditions utilized in the process using the nickel catalyst. The data are shown in Table I.

Table I

| Catalyst | | Impregnation | Reduction time, hr. | Hydrogenation Test | | |
|---|---|---|---|---|---|---|
| | | | | Temp., F. | Time, min. | Average percentage hydrogenation |
| D | NiO-Al$_2$O$_3$ | Complete | 4 | 32 | 30 | −1.0 |
|   | NiO-Al$_2$O$_3$ | do       | 29 | 32 | 60 | 60.6 |
| E | NiO-Al$_2$O$_3$ | Incomplete | 4 | 32 | 60 | 74.1 |
|   | NiO-Al$_2$O$_3$ | do       | 5 | 32 | 60 | 84.3 |
| F | NiO-ZnO | Complete | 5 | 300 | 30 | 47.5 |
| G | NiO-ZnO | Incomplete | 5 | 300 | 30 | 48.8 |
| H | NiO-SiAl | Complete | 6 | 32 | 30 | 65.7 |
| I | NiO-SiAl | Incomplete | 6 | 32 | 30 | 80.2 |
| J | CuO-Al$_2$O$_3$ | Incomplete | 7 | 400 | 30 | 45.0 |

It is apparent from the data shown in Table I that catalysts E, G, and I having the active catalyst constituent deposited only in the porous shell of the pellets are more active in the hydrogenation of ethylene than catalysts D, F, and H in which an equal amount of the active catalyst is deposited rather uniformly throughout the entire pellet.

It is to be understood that the active constituent of the catalysts in the runs made in ethylene hydrogenation is metallic nickel and not the nickel oxide produced by the calcination of the pellets after impregnation. With this in mind it can be seen that the method of the invention offers an advantage in addition to higher activity, viz., a considerably shorter period of reduction required to activate the nickel catalyst as is shown in Table I. Catalyst E in two separate runs was reduced 4 and 5 hours, respectively, and showed an average percentage of hydrogenation of 74.1 and 84.3, respectively. When catalyst D, made by complete impregnation, was reduced for 4 hours at the same temperature, the activity of the resulting catalyst was negligible while after reduction for 29 hours at the common reducing temperature of 650° F. the activity was only 60.6 average percentage hydrogenation.

The examples also clearly illustrate another advantage of the invention in addition to those already set forth. This advantage is in the shorter calcination time required prior to the impregnation step. While a calcination time of only 3 to 15 minutes prior to the impregnation step is required by this specific process, a calcination time considerably greater is required by the prior art process by which a porous alumina pellet is impregnated completely. The remaining portion of the binder not burned out in the initial calcination is removed during the calcination following the impregnation by means of which the metal compound in the shell of the pellet is converted to the oxide. Generally, no additional time is required for the removal of the binder during this second calcination and therefore a saving of considerable calcination time is effected.

While the copper on alumina catalyst was less active for the hydrogenation of ethylene than the nickel on alumina catalyst, the difference is inherent in the metals themselves and is not attributable to the method used in preparing the catalyst. There are other reactions in which a copper catalyst deposited on a porous support is a superior catalyst.

Nickel oxide per se is also an excellent catalyst in a variety of reactions and particularly in the polymerization of normally gaseous aliphatic olefins to higher molecular weight aliphatic olefin polymers. Nickel oxide deposited on silica-alumina and activated in the temperature range of 400 to 700° F. in an oxidizing atmosphere is an unusual catalyst for such polymerization as is disclosed in U. S. application, Serial No. 599,536, filed June 15, 1945.

It is to be understood that the reducing temperature of 650° F. used in the examples is not a limitation on the process since any effective reducing temperature can be utilized to effect the reduction of all or a part of the metal oxide in the composite. The specific temperature to be used in any reduction depends upon the particular metal oxide being reduced, and also upon the reducing ambient which is usually hydrogen but also may be other reducing gases.

The preparation of nickel and nickel oxide catalysts disclosed in the examples can be applied to the preparation of other metal and metal oxide catalysts and particularly to group VIII metals. Cobalt and cobalt oxide are often the substantial equivalents of nickel and nickel oxide catalysts. My method of preparation of catalysts may also be applied to the preparation of noble metal catalysts and their oxides where such oxides are stable and useful as catalysts. Silver, gold, platinum, and palladium are particularly economical and effective catalysts when made by the inventive method as compared with these metals when deposited on non-porous or impervious supports as well as when deposited on porous supports throughout the entire support particle. The usual practice when making and using catalysts of this type where the metal is valuable and expensive is to deposit the same from a solution of its salt on a non-porous support in particulate form so as to retain the metal at the surface of the support where it is readily available to the reactants and recoverable from the spent catalyst without undue loss, both of which conditions do not obtain in a catalyst of this type deposited in the pores of a porous support throughout its entire mass. By distending these metals on porous supports having a non-porous core during the impregnation step as obtains in my method of catalyst preparation, the available surface of the catalytic metal is multiplied many fold for a support particle of a given size and the metal is also readily available for contact with reactants and recoverable from the deactivated catalyst for reaction in catalyst preparation or other utility. The thickness of the porous shell formed during the partial combustion of the binder of the pellets can readily be regulated so as to place the catalytic metal or metal oxide as close to the surface of the pellet as expedient. The shell so formed should be relatively thin or small with respect to the pellet diameter when making catalysts of this type where the cost of the catalytic metal is extremely high.

The illustrative details set forth herein are not to be construed as imposing unnecessary limitations upon the invention, the scope of which is set forth in the claims.

This application is a continuation-in-part of my copending application, Serial No. 705,659, filed October 25, 1946, now abandoned.

I claim:

1. A process for the manufacture of a pelleted composite alumina-chromia catalyst which comprises admixing particulate alumina with a combustible binder, forming the resulting mixture into pellets, removing from 50 to 75 percent of the binder from the pellets by combustion so as to form a porous shell around a relatively impervious core in each pellet, impregnating the resulting porous shell of the pellets with an aqueous solution of a chromium compound converted to $Cr_2O_3$ upon heating, and heating the resulting impregnated pellets to an elevated temperature in an oxidizing atmosphere for a period of time sufficient to convert said chromium compound to $Cr_2O_3$ and burn out the remaining portion of the binder.

2. A process for the preparation of a composite metal oxide catalyst as defined by claim 1 wherein the chromium compound is chromium trioxide.

3. A process for the preparation of a composite metal oxide catalyst as defined in claim 1 wherein the chromium compound is chromic nitrate.

4. A process for the manufacture of a composite catalyst comprising alumina as the major component and a chromium compound which comprises admixing powdered alumina with a combustible binder, forming the resulting mixture into compact pellets, heating the pellets to a temperature within the range of from about 400 to about 1100° F. for a period of time sufficient to remove by combustion from about 50 to about 75 percent of the binder, impregnating the resulting porous portion of said pellets with a salt of chromium, and converting said chromium salt to a catalytically active form.

5. A process for the manufacture of a composite metal oxide catalyst comprising alumina as the major component and an oxide of chromium which comprises admixing powdered alumina with a combustible binder, forming the resulting mixture into pellets, heating the resulting pellets at a temperature within the range of from about 400 to about 1100° F. for a period of time sufficient to remove by combustion from about 50 to about 75 percent of said binder, impregnating the resulting porous shell of said pellets with an aqueous solution of a salt of chromium, and heating the impregnated pellets at a temperature within the range of from about 400 to 1100° F. for a period of time sufficient to convert said salt of chromium to an oxide of chromium and to effect substantially complete removal of the remaining portion of the binder.

6. The process of claim 5 in which the binder is an oil.

7. A process for the manufacture of a pelleted composite alumina-chromia catalyst which comprises admixing particulate alumina with a combustible binder, forming the resulting mixture into pellets, removing from 15 to 85 per cent of the binder from the pellets by combustion so as to form a porous shell around a relatively impervious core in each pellet, impregnating the resulting porous shell of the pellets with an aqueous solution of a chromium compound converted to $Cr_2O_3$ upon heating, and heating the resulting impregnated pellets to an elevated temperature in an oxidizing atmosphere for a period of time sufficient to convert said chromium compound to $Cr_2O_3$ and burn out the remaining portion of the binder.

8. A process for the manufacture of a pelleted composite alumina-metal oxide catalyst which comprises admixing particulate alumina with a combustible binder, forming the resulting mixture into pellets, removing from 15 to 85 per cent of the binder from the pellets by combustion so as to form a porous shell surrounding a relatively impervious core in each pellet, impregnating the resulting porous shell of the pellets with an aqueous solution of a metal compound converted to the oxide upon calcination, and calcining the resulting impregnated pellets at an elevated temperature for a period of time sufficient to convert said metal compound to an oxide thereof and burn out the remaining portion of the binder.

9. The process of claim 8 in which the metal oxide is readily reducible to the metal and in which the pellets are heated in a reducing atmosphere to an elevated temperature so as to convert at least a portion of the metal oxide to metal.

10. The process of claim 8 in which the impregnating metal compound is a compound of molybdenum.

11. The process of claim 8 in which the impregnating metal compound is a compound of vanadium.

12. The process of claim 8 in which the impregnating metal compound is a compound of copper.

13. The process of claim 8 in which the impregnating metal compound is a compound of nickel.

14. A process for the manufacture of a pelleted composite alumina-containing carrier impregnated with a metal oxide catalyst which comprises pelleting an alumina-containing carrier with a combustible binder, burning out from 15 to 85 per cent of the binder from the pellets so as to form a porous shell around the relatively impervious core in each pellet, impregnating the resulting porous shell of the pellets with an aqueous solution of a metal compound converted to the oxide upon calcination, and calcining the shell-impregnated pellets at an elevated temperature for a period of time sufficient to convert the metal compound to an oxide and burn out the remaining portion of the binder.

15. The process of claim 14 in which the carrier consists principally of silica and alumina.

16. The process of claim 15 in which the metal compound is a compound of nickel.

17. The process of claim 16 in which the nickel oxide is heated in a reducing ambient so as to reduce a major portion of the nickel oxide to metallic nickel.

18. A catalyst consisting essentially of a porous alumina pellet impregnated with a shell of chromium oxide manufactured by the process of claim 1.

19. A catalyst consisting essentially of a porous silica-alumina pellet impregnated with a shell of nickel oxide manufactured by the process of claim 16.

20. The catalyst of claim 19 in which the nickel oxide has been reduced to metallic nickel.

21. A catalyst consisting essentially of a porous alumina pellet impregnated with a shell of molybdenum oxide manufactured by the process of claim 8.

22. A catalyst consisting essentially of a porous alumina pellet impregnated with a shell of vanadium oxide manufactured by the process of claim 8.

23. A catalyst consisting essentially of a porous alumina pellet impregnated with a shell of copper oxide manufactured by the process of claim 8.

24. A catalyst consisting essentially of a porous alumina pellet impregnated with a shell of nickel oxide manufactured by the process of claim 8.

25. A catalyst consisting essentially of a porous alumina pellet impregnated with a shell of metal oxide manufactured by the process of claim 8.

26. A catalyst consisting essentially of a porous silica-alumina pellet impregnated with a shell of metal oxide manufactured by the process of claim 15.

27. A catalyst consisting essentially of a porous alumina-containing pellet impregnated with a shell of metal oxide manufactured by the process of claim 14.

JAMES R. OWEN.

REFERENCES CITED

The following references are of record in the file of this patent:

UNITED STATES PATENTS

| Number | Name | Date |
| --- | --- | --- |
| 2,123,732 | Keitel et al. | June 12, 1938 |
| 2,500,146 | Fleck et al. | Mar. 14, 1950 |